G. K. RIX, DEC'D.
W. B. RIX, ADMINISTRATOR.
CAT, SQUIRREL, AND ANIMAL GUARD.
APPLICATION FILED APR. 20, 1917.

1,286,416. Patented Dec. 3, 1918.

Inventor
George K. Rix (deceased),
By Walter B. Rix (admr.)
Harry Lea Dodson.
Atty

UNITED STATES PATENT OFFICE.

GEORGE K. RIX, DECEASED, LATE OF WILMETTE, ILLINOIS, BY WALTER B. RIX, ADMINISTRATOR, OF CHICAGO, ILLINOIS, ASSIGNOR TO JOSEPH H. DODSON, OF CHICAGO, ILLINOIS.

CAT, SQUIRREL, AND ANIMAL GUARD.

1,286,416.      Specification of Letters Patent.      Patented Dec. 3, 1918.

Application filed April 20, 1917. Serial No. 163,475.

*To all whom it may concern:*

Be it known that GEORGE K. RIX, who was a citizen of the United States, residing at Wilmette, in the county of Cook and State of Illinois, was the inventor of a certain new and useful Improvement in Cat, Squirrel, and Animal Guards, of which the following is a specification.

The invention is designed to protect birds from their enemies, such as cats, squirrels, and other animals and this result is attained by means of a simple and easy expansible device, which is attached to the trunk of a tree, about six feet from the ground, as clearly shown in the drawing.

The invention has for its object to produce a simple and easy means for keeping the cat, squirrel and other animals out of the trees where the birds are nesting, thereby protecting the birds, and has for its further object to provide a device which will expand with the growth of the tree.

The means of accomplishing the foregoing objects may be more readily understood by having reference to the accompanying drawings, which are hereunto annexed and are a part of this specification, in which.

Similar reference numerals refer to similar parts throughout the entire description.

Figure 1:
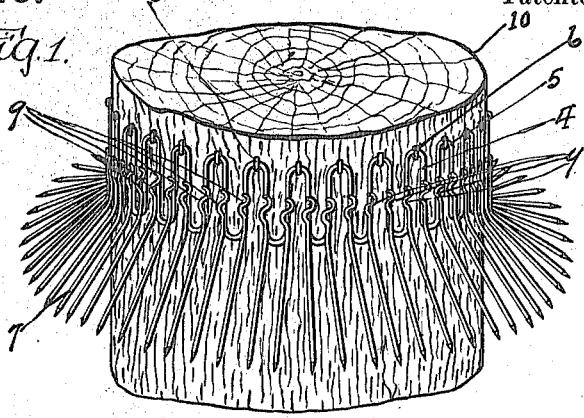
Figure 1 is a perspective view of our device attached to a tree, showing a fragmentary portion of the trunk.
Figure 2:
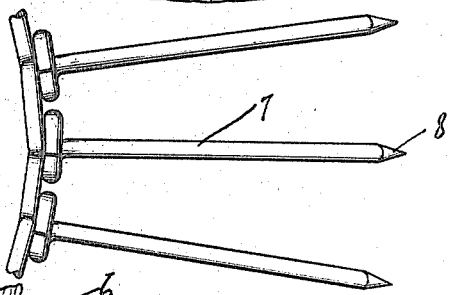
Fig. 2 is an enlarged detail view in plan of a portion of our device.
Figure 3:
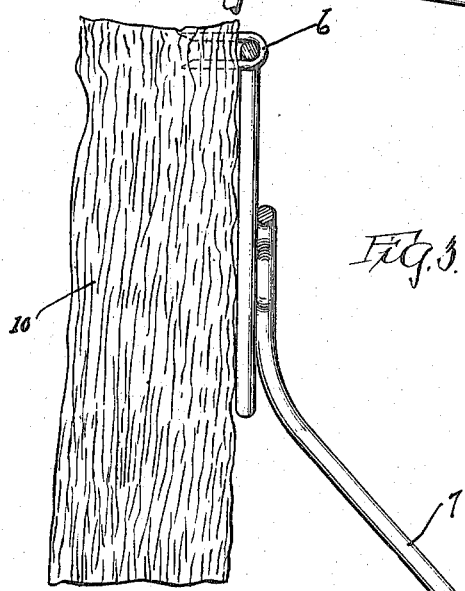
Fig. 3 is a side elevation of the same.

As shown in the drawings, the guard is formed of wire 4, formed into a plurality of plaits which are designed to have the looped ends 5 thereof secured to the tree trunk 10 by means of staples 6, or in any other convenient or desired manner.

Secured to the edge of each plait is a spike 7, which extends outwardly and downwardly therefrom, the end 8 of which is sharpened, the inner end 9, is bent as clearly shown in Fig. 1 giving additional bearing spaces for securing the spikes to the plaits.

Inasmuch as the wire 4 forming the plaits, is formed of flexible material, the plaits simply open up, as the size of the tree trunk increases thus, permitting the growth of the tree, without the slightest injury thereto.

At the same time, the spikes extending outwardly from the tree trunk a considerable distance as they do, and having the sharpened ends effectually prevent any animal from climbing around or over the guard.

Practice has shown that by the use of these guards, the birds can rear their broods in perfect safety, regardless of the number of cats, squirrels and bird enemies in the neighborhood.

Having described the invention what we regard as new and desire to secure by Letters Patent is:

A device of the character described, comprising a wire formed into a plurality of plaits, a plurality of spikes, said spikes being inclined at an angle to said plaits, and having sharpened points, each of said spikes having its inner end bent transversely to constitute bearing surfaces which are secured to the edge of one of said plaits.

In testimony whereof, I have signed the foregoing specification.

WALTER B. RIX,

*Administrator of the Estate of George K. Rix, deceased.*

Copies of this patent may be obtained for five cents each, by addressing the "Commissioner of Patents, Washington, D. C."